United States Patent [19]
Binard et al.

[11] 3,798,489
[45] Mar. 19, 1974

[54] PLASMA FURNACE

[75] Inventors: Pierre Binard, Embourg; Georges Defosse, Wandre; Jean Marie Jacquerie, Seraing, all of Belgium

[73] Assignee: Elphiac, Brussels, Belgium

[22] Filed: May 4, 1972

[21] Appl. No.: 250,165

[30] Foreign Application Priority Data
May 7, 1971  Belgium .............................. 103160

[52] U.S. Cl.................. 313/231, 315/111, 315/248
[51] Int. Cl............................................. H01j 17/26
[58] Field of Search ............. 313/231; 315/111, 248

[56] References Cited
UNITED STATES PATENTS
3,530,335  9/1970  Thorpe et al...................... 315/111

*Primary Examiner*—Herman Karl Saalbach
*Assistant Examiner*—Darwin R. Hostetter

[57] ABSTRACT

A plasma furnace comprising a chamber having inlet nozzles for a gas to be ionized, a reaction chamber defined by a large number of non-magnetic cooled metallic conduits placed side by side and electrically insulated from each other, a tube for feeding materials to be treated inside the reaction chamber, and an inductor fed by an alternating current surrounding the reaction chamber. The plasma furnace is characterized in that the metallic conduits are secured on the inside surface of a tube made of insulating material protecting the inductor, and in that at least one out of two metallic conduits defining the reaction chamber comprises at least one concave portion into which is inserted one convex portion of an adjacent metallic conduit in such a manner that the insulating tube protecting the inductor is not seen from any location inside the reaction chamber, but that the metallic conduits are separated from each other by a space preventing any contact of the metallic conduits with each other.

4 Claims, 5 Drawing Figures

PLASMA FURNACE

This invention relates to a plasma furnace.

Plasma furnaces are know which comprise a chamber having inlet nozzles for a gas to be ionized, a reaction chamber defined by a large number of non-magnetic cooled metallic conduits placed side by side and separated from each other by a refractory electrical insulation, a conduit for feeding materials to be treated into the reaction chamber, and an inductor surrounding the reaction chamber and fed by a high frequency current.

The above plasma furnaces are actually limited in their application to powers of the order of 100KW. The object of the invention is to increase the power of these furnaces to 1,000KW and more so as to permit metallurgical or chemical operations at an industrial scale such as the direct reduction of minerals.

Therefore, the plasma furnace in accordance with the invention is characterized in that the non-magnetic cooled metallic conduits are fixed on the inside surface of a tube made of insulating material protecting the inductor and in that at least one out of two metallic conduits defining the reaction chamber comprises at least one concave portion into which is inserted a convex portion of an adjacent metallic conduit, so that the insulating tube protecting the inductor is not seen from any location inside the reaction chamber, and that the metallic conduits are separated from each other by a space preventing any contact of the metallic conduits with each other.

The invention will now be disclosed with reference to a few embodiments thereof and to the accompanying drawings in which.

Figure 1:
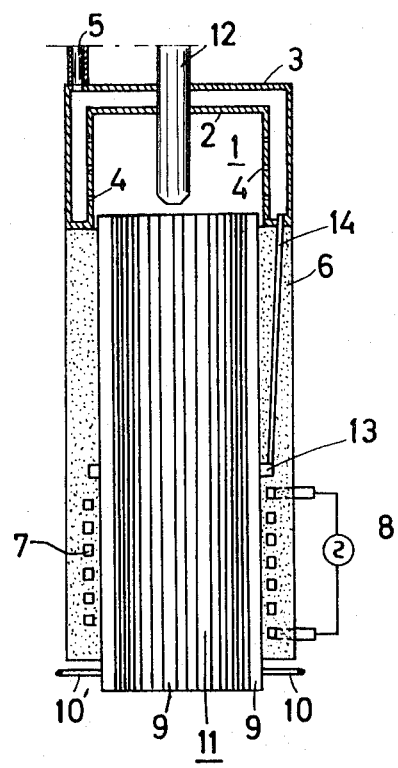
FIG. 1 illustrates a longitudinal section through a plasma furnace.

Referring to FIG. 1, there is shown a nozzle chamber 1 constituted by a cylindrical head which may be water cooled and having two walls 2 and 3. The cylindrical surface of the inside wall 2 is provided with nozzles 4. The space between the two walls 2 and 3 is fed with an ionizable gas at high temperature such as, for example, Argon by means of an inlet conduit 5. The nozzle chamber 1 is placed on the top portion of a tube 6 made of an organic insulating material, such as, for example, epoxy resin loaded with quartz. Placed around the insulating tube 6 or embedded in it is an induction coil 7 which is connected to an alternating current source 8 which may be of high, intermediate or low frequency. On the inside surface of the insulating tube 6 is secured a row of non-magnetic metallic conduits 9 which are water cooled. These metallic conduits are placed two by two in a hairpin fashion and are all provided at one of their ends with a water inlet pipe 10 or a water outlet pipe 10' and communicate with one of the adjacent conduits at their other ends. Thus water enters by one of the conduits 9 and exits by the adjacent conduit forming the second branch of the hairpin. The conduits 9 protect the insulating tube 6 from the heat developed inside the reaction chamber 7 which they define. In such reaction chamber, the induced field heats the ionized gas until it reaches a temperature which may exceed 15,000°K. The radiant energy thus liberated is absorbed by the metallic conduits 9. To prevent that the organic insulating material of tube 6 be exposed to this hot radiant energy, at least one out of two of the metallic ocnduits 9 comprise at least one concave portion into which is inserted a convex portion of one of the adjacent conduits, without however touching it.

Figure 2:
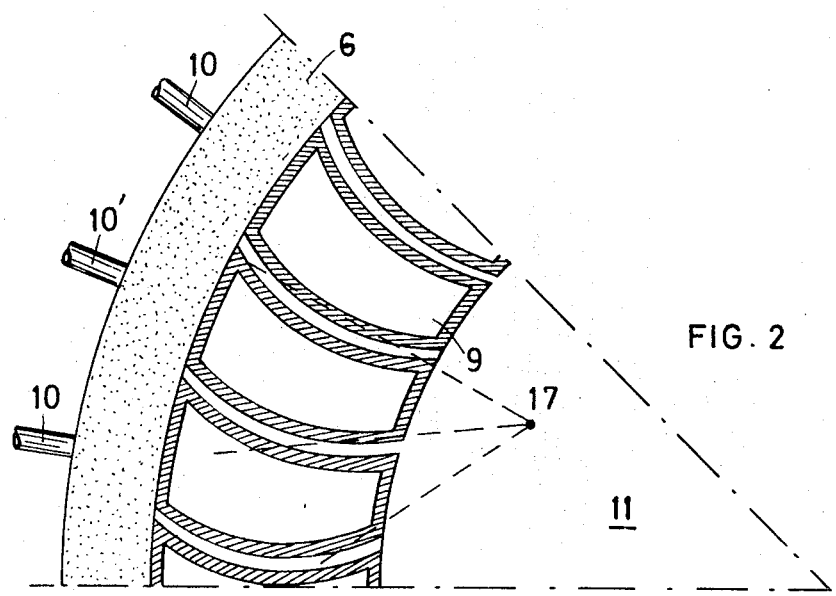
FIGS. 2 to 5 are partial cross-sectional views through a plasma furnace of the type shown FIG. 1 and illustrating various types of metallic conduits delimiting the reaction chamber of the plasma furnace.

The above may be obtained by various arrangements; a same profile may be used to realize chambers having very different diameters and lengths. FIG. 2 illustrates one example in which the conduits 9 have a cross section of the shape of concave-convex cylindrical lenses. The convex portion of one lens is inserted into the concave portion of the other while leaving a sufficient distance between the two so as to insure the electrical insulation during operation and to prevent that the tube 6 be visible from any point inside the reaction chamber 11. This condition is realized if the convex surface of a conduit and the concave surface of the adjacent conduit are both crossed by the same radius having as an origin any point 17 inside the reaction chamber and if there is no point 17 for which this condition is not verified. The notion of reaction chamber applied to the cylindrical space having a circular section inside the row of conduits 9.

Figure 3:
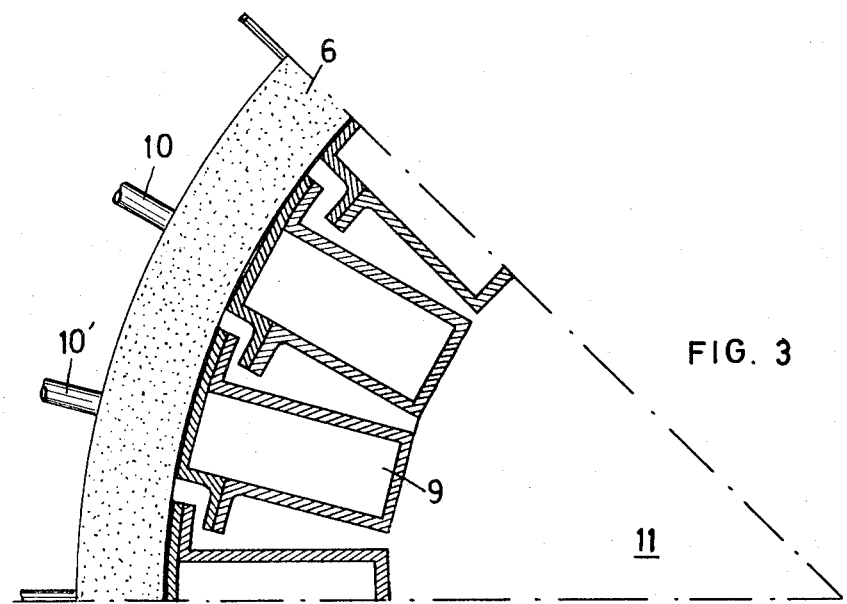
Figure 4:
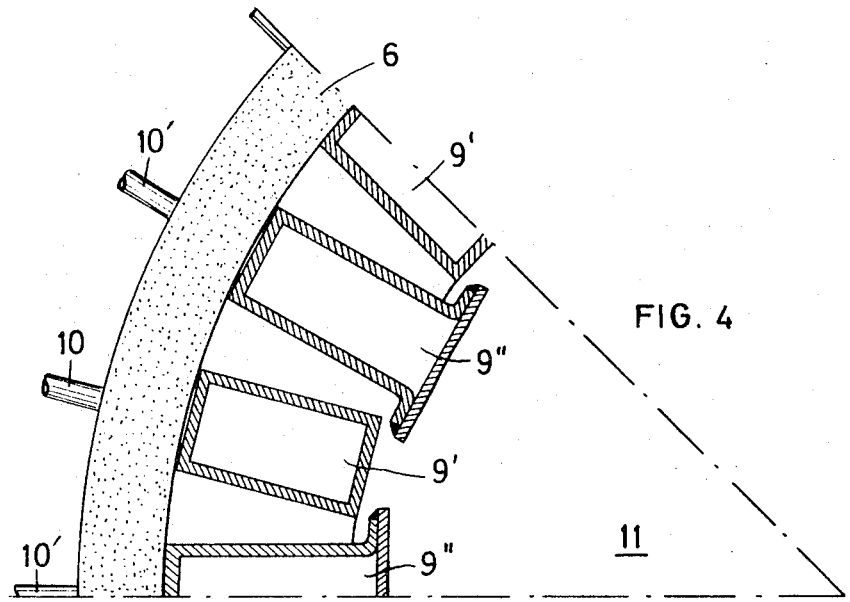

FIGS. 3 and 4 illustrate two other shapes of metallic conduits 9. In FIGS. 2 and 3 all the metallic conduits 9 have the same shape of concave-convex lenses and spur boots respectively. In FIG. 4, on the contrary, the metallic conduits 9 are made of conduits of rectangular cross section 9' and of conduits of T-shaped cross section 9''. In this case, the feeding of cooling water which is done through pipes 10 and 10' is, for example, through conduits 9' and the water return through conduits 9''. In this manner, the conduits 9', which are further away from the center of the reaction chamber, are cooler than the surfaces of the conduits 9'' which are closer to the heat source, which permits to make uniform the gradiant of temperature inside the reaction chamber.

The nozzle chamber 1 is crossed by a conduit 12 for feeding the materials to be treated.

An ionizable gas may be fed in the spaces between the metallic conduits 9. For that purpose, one or plural cold gas annular distribution conduits 13 are provided in the tube 6 and connected, for example, by one or plural conduits 14 to the space between the walls 2 and 3 of the nozzle chamber 1. The gas introduced by the annular conduits 13 is spread through the spaces between the conduits 9 and prevent hot gases from penetrating through the spaces to damage the insulating material of tube 6.

Figure 5:
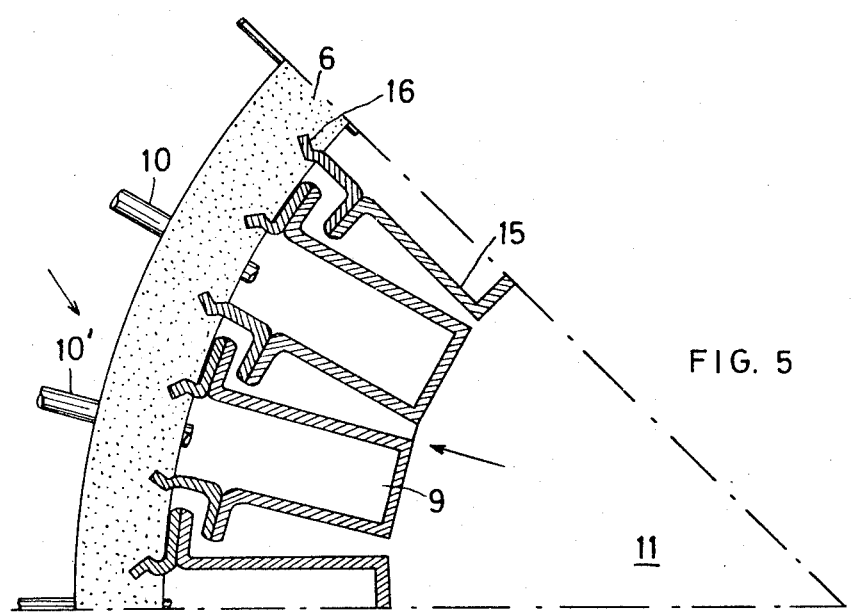

When the arrangement according to FIG. 2 is used, the gas spreading out of the curved spaces between the conduits 9 have a tendency to maintain a gyratory movement around the axis of the reaction chamber, which is highly desirable, because such a movement stabilizes the layer of cold gas adjacent to conduits 9. In an effort to reduce the losses of material to a minimum, an arrangement in accordance with FIG. 5 may be used. The metallic conduits 9 are open along a generatrix and are thus made of strips of folded metal 15 the free edges 16 of which are embedded into the insulating material of the protecting tube 6. Adjacent to the lateral edges 16, anchoring folds or teeth may be provided.

I claim:

1. In a plasma furnace comprising a chamber having inlet nozzles for a gas to be ionized, a reaction chamber defined by a large number of non-magnetic cooled metallic conduits placed side by side and electrically insulated from each other, a tube for feeding materials to be treated inside said reaction chamber, and an inductor fed by an alternating current surrounding said reaction chamber, the improvement wherein the metallic conduits are secured on the inside surface of a tube made of insulating material protecting the inductor, and wherein at least one out of two metallic conduits defining the reaction chamber comprises at least one concave portion into which is inserted a convex portion of an adjacent metallic conduit in such a manner that the insulating tube protecting the inductor is not seen from any location inside the reaction chamber, but that the metallic conduits are separated from each other by a space preventing any contact of the metallic conduits with each other.

2. A plasma furnace as defined in claim 1, wherein the metallic conduits have a cross section of the shape of concave-convex cylindrical lenses in such a manner that the convex surface of a conduit and the concave surface of the adjacent conduit are both crossed by a same radius having its origin anywhere inside the reaction chamber.

3. A plasma furnace as defined in claim 1, wherein one or plural ionizable gas distribution conduits are provided inside the insulating tube protecting the inductor and are placed in communication with the spaces between the metallic conduits.

4. A plasma furnace as defined in claim 1, wherein the insulating tube protecting the inductor is made of an organic material.

* * * * *